US012399621B2

(12) United States Patent
Joshi et al.

(10) Patent No.: US 12,399,621 B2
(45) Date of Patent: Aug. 26, 2025

(54) AUTOMATED MEMORY OVERCLOCKING

(71) Applicant: Advanced Micro Devices, Inc., Santa Clara, CA (US)

(72) Inventors: Jayesh Hari Joshi, Austin, TX (US); Alicia Wen Ju Yurie Leong, Austin, TX (US); William Robert Alverson, Del Valle, TX (US); Joshua Taylor Knight, Georgetown, TX (US); Jerry Anton Ahrens, Sister Bay, WI (US); Grant Evan Ley, Eden, UT (US); Amitabh Mehra, Fort Collins, CO (US); Anil Harwani, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/147,963

(22) Filed: Dec. 29, 2022

(65) Prior Publication Data
US 2024/0220108 A1 Jul. 4, 2024

(51) Int. Cl.
*G06F 3/06* (2006.01)

(52) U.S. Cl.
CPC ............ *G06F 3/061* (2013.01); *G06F 3/0653* (2013.01); *G06F 3/0673* (2013.01)

(58) Field of Classification Search
CPC ....... G06F 3/061; G06F 3/0653; G06F 3/0673
USPC .......................................................... 713/600
See application file for complete search history.

(56) References Cited

U.S. PATENT DOCUMENTS

| 6,219,241 | B1  | 4/2001  | Jones |
|-----------|-----|---------|-------|
| 7,382,366 | B1* | 6/2008  | Klock ................. G06F 11/24 |
|           |     |         | 714/E11.154 |
| 7,469,355 | B1  | 12/2008 | Chong |
| 7,500,122 | B2  | 3/2009  | Won et al. |
| 10,852,761 | B2 | 12/2020 | Irshad et al. |
| 11,262,924 | B2 | 3/2022  | Alverson et al. |

(Continued)

FOREIGN PATENT DOCUMENTS

| CN | 2665787 Y   | 12/2004 |
|----|-------------|---------|
| CN | 208673319 U | 3/2019  |

(Continued)

OTHER PUBLICATIONS

U.S. Appl. No. 17/708,453 , "Final Office Action", U.S. Appl. No. 17/708,453, filed Jul. 20, 2023, 12 pages.

(Continued)

*Primary Examiner* — Paul R. Myers
(74) *Attorney, Agent, or Firm* — FIG. 1 Patents

(57) ABSTRACT

Automated memory overclocking is described. In accordance with the described techniques, one or more sets of overclocked memory settings of a memory are automatically selected for performance testing and stability testing of the memory. The one or more sets of the overclocked memory settings are tested for performance of the memory and a performance indication is output for each of the one or more sets of the overclocked memory settings. The one or more sets of the overclocked memory settings are tested for stability of the memory and a stability indication is output for each of the one or more sets of the overclocked memory settings. One of the one or more sets of the overclocked memory settings are selected as optimized overclocked memory settings for the memory.

20 Claims, 6 Drawing Sheets

(56) References Cited

U.S. PATENT DOCUMENTS

| | | | |
|---|---|---|---|
| 11,609,596 B2 | 3/2023 | Sin et al. | |
| 11,977,757 B2 | 5/2024 | Ley et al. | |
| 12,038,779 B2 | 7/2024 | Mehra et al. | |
| 2002/0161609 A1* | 10/2002 | Zizzamia | G06Q 40/08 705/4 |
| 2003/0065915 A1 | 4/2003 | Yu et al. | |
| 2003/0097602 A1 | 5/2003 | Bigbee et al. | |
| 2003/0202512 A1* | 10/2003 | Kennedy | H04W 40/14 370/395.31 |
| 2005/0266711 A1* | 12/2005 | Petersen | G11C 5/147 439/225 |
| 2006/0146638 A1* | 7/2006 | Chang | G11C 11/413 257/E27.099 |
| 2006/0149975 A1 | 7/2006 | Rotem et al. | |
| 2006/0280018 A1* | 12/2006 | Cases | G06F 13/4072 365/226 |
| 2007/0035985 A1* | 2/2007 | Fifield | G11C 11/413 365/154 |
| 2007/0044049 A1* | 2/2007 | Adams | G06F 30/367 700/109 |
| 2007/0106428 A1 | 5/2007 | Omizo et al. | |
| 2007/0183179 A1* | 8/2007 | Maeda | G06F 3/0659 365/52 |
| 2008/0114973 A1 | 5/2008 | Norton et al. | |
| 2008/0230893 A1 | 9/2008 | Too et al. | |
| 2008/0276026 A1 | 11/2008 | Branover et al. | |
| 2010/0131221 A1* | 5/2010 | Chien | G11C 29/023 702/81 |
| 2010/0220516 A1* | 9/2010 | Lee | G06F 30/39 365/158 |
| 2011/0016214 A1 | 1/2011 | Jackson | |
| 2011/0040902 A1 | 2/2011 | Housty | |
| 2011/0161706 A1 | 6/2011 | Huang et al. | |
| 2011/0231637 A1 | 9/2011 | Schuette | |
| 2014/0006864 A1* | 1/2014 | Menon | G11C 29/022 714/E11.178 |
| 2014/0032826 A1 | 1/2014 | Lee et al. | |
| 2014/0095904 A1 | 4/2014 | Ananthakrishnan et al. | |
| 2014/0229666 A1* | 8/2014 | Schoenborn | G11C 11/4074 711/167 |
| 2015/0016191 A1 | 1/2015 | Tsai et al. | |
| 2015/0270018 A1* | 9/2015 | Chinnakkonda Vidyapoornachary | G11C 29/50 714/721 |
| 2016/0084919 A1* | 3/2016 | Gokaraju | H02P 9/102 702/182 |
| 2017/0262354 A1 | 9/2017 | Han | |
| 2018/0095806 A1 | 4/2018 | Aneja et al. | |
| 2018/0188769 A1 | 7/2018 | Chen et al. | |
| 2018/0188770 A1 | 7/2018 | Chen | |
| 2019/0079806 A1 | 3/2019 | Ragland et al. | |
| 2020/0019462 A1 | 1/2020 | Prather et al. | |
| 2020/0049157 A1 | 2/2020 | Richter | |
| 2020/0097201 A1 | 3/2020 | Irshad et al. | |
| 2020/0192420 A1* | 6/2020 | Irshad | G09G 5/39 |
| 2020/0364041 A1 | 11/2020 | Bulusu et al. | |
| 2021/0068302 A1 | 3/2021 | North et al. | |
| 2021/0081127 A1 | 3/2021 | Xiao et al. | |
| 2021/0191450 A1* | 6/2021 | Mehra | G06F 1/3296 |
| 2021/0200456 A1* | 7/2021 | Alverson | G11C 29/10 |
| 2021/0326232 A1* | 10/2021 | Partiwala | G06F 11/3428 |
| 2021/0373642 A1 | 12/2021 | Wang et al. | |
| 2022/0093197 A1 | 3/2022 | Wu et al. | |
| 2022/0113757 A1* | 4/2022 | Yan | G06F 1/3243 |
| 2022/0113881 A1 | 4/2022 | Roberts | |
| 2022/0155982 A1 | 5/2022 | Alverson et al. | |
| 2022/0179706 A1* | 6/2022 | Khosrowpour | G06F 11/3466 |
| 2022/0197832 A1 | 6/2022 | Ruttenberg et al. | |
| 2023/0107735 A1* | 4/2023 | Wang | H04L 67/02 370/235 |
| 2023/0215475 A1* | 7/2023 | Chien | G11C 7/1021 365/193 |
| 2023/0315171 A1 | 10/2023 | Ahrens et al. | |
| 2023/0315191 A1 | 10/2023 | Alverson et al. | |
| 2023/0324967 A1 | 10/2023 | Ahrens et al. | |
| 2023/0350591 A1 | 11/2023 | Ley et al. | |
| 2023/0350696 A1 | 11/2023 | Harwani et al. | |
| 2023/0350715 A1 | 11/2023 | Knight et al. | |
| 2023/0409368 A1* | 12/2023 | Siddiqui | G06F 1/08 |
| 2024/0143445 A1 | 5/2024 | Leong et al. | |
| 2024/0211142 A1 | 6/2024 | Leong et al. | |
| 2025/0216888 A1 | 7/2025 | Rodrigue et al. | |

FOREIGN PATENT DOCUMENTS

| | | |
|---|---|---|
| WO | 2023211606 A1 | 11/2023 |
| WO | 2024144868 A1 | 7/2024 |

OTHER PUBLICATIONS

U.S. Appl. No. 17/708,453, "Non-Final Office Action", U.S. Appl. No. 17/708,453, filed Mar. 14, 2023, 11 pages.

U.S. Appl. No. 17/708,453, "Non-Final Office Action", U.S. Appl. No. 17/708,453, filed Sep. 8, 2023, 13 pages.

U.S. Appl. No. 17/732,718, "Non-Final Office Action", U.S. Appl. No. 17/732,718, filed Sep. 14, 2023, 17 pages.

Cutress, Ian, "Intel Launches Xeon-W CPUs for Workstations: Skylake-SP & ECC for LGA2066", AnandTech [Online][retrieved Oct. 11, 2023]. Retrieved from the Internet < https://www.anandtech.com/show/11775/intel-launches-xeon-w-cpus-for-workstations>, Aug. 29, 2017, 8 pages.

PCT/US2023/014176, "International Search Report and Written Opinion", PCT Application No. PCT/US2023/014176, Jun. 12, 2023, 8 pages.

PCT/US2023/062509, "International Search Report and Written Opinion", PCT Application No. PCT/US2023/062509, May 26, 2023, 10 pages.

PCT/US2023/063347, "International Search Report and Written Opinion", PCT Application No. PCT/US2023/063347, Jun. 13, 2023, 8 pages.

Rodrigue, Wayne Paul, et al., "Pursuant to MPEP § 2001.06(b) the applicant brings the following co-pending application to the Examiner's attention:", U.S. Appl. No. 18/399,052, filed Dec. 28, 2023, 52 pages.

Knight, Joshua Taylor, et al., "US Application as Filed", U.S. Appl. No. 17/732,987, filed Apr. 29, 2022, 41 pages.

Leong, Alicia Wen Ju Yurie, et al., "US Application as Filed", U.S. Appl. No. 17/974,981, filed Oct. 27, 2022, 41 pages.

Leong, Alicia Wen Ju Yurie, et al., "US Application as Filed", U.S. Appl. No. 18/146,538, filed Dec. 27, 2022, 46 pages.

U.S. Appl. No. 17/974,981, "Non-Final Office Action", U.S. Appl. No. 17/974,981, filed Jan. 31, 2024, 11 pages.

PCT/US2023/036338, "International Seach Report and Written Opinion", PCT Application No. PCT/US2023/036338, Feb. 20, 2024, 7 pages.

U.S. Appl. No. 17/974,981, "Final Office Action", U.S. Appl. No. 17/974,981, filed May 24, 2024, 13 pages.

"Non-Final Office Action", U.S. Appl. No. 17/732,987, filed Nov. 22, 2024, 27 pages.

"Final Office Action", U.S. Appl. No. 17/732,987, May 14, 2025, 17 pages.

"Non-Final Office Action", U.S. Appl. No. 17/974,981, Mar. 10, 2025, 12 pages.

"Non-Final Office Action", U.S. Appl. No. 18/399,052, Jun. 4, 2025, 15 pages.

* cited by examiner

AUTOMATED MEMORY OVERCLOCKING

BACKGROUND

Memory, such as random access memory (RAM), stores data that is used by the processor of a computing device. Performance of a memory generally depends on its operating frequency as well as its latency characteristics, which are often referred to as "timings". A memory can be "overclocked" by modifying specific parameters of the memory in order to achieve faster operating speeds which improves the performance of the computing device.

DETAILED DESCRIPTION

Overview

Figure 1:
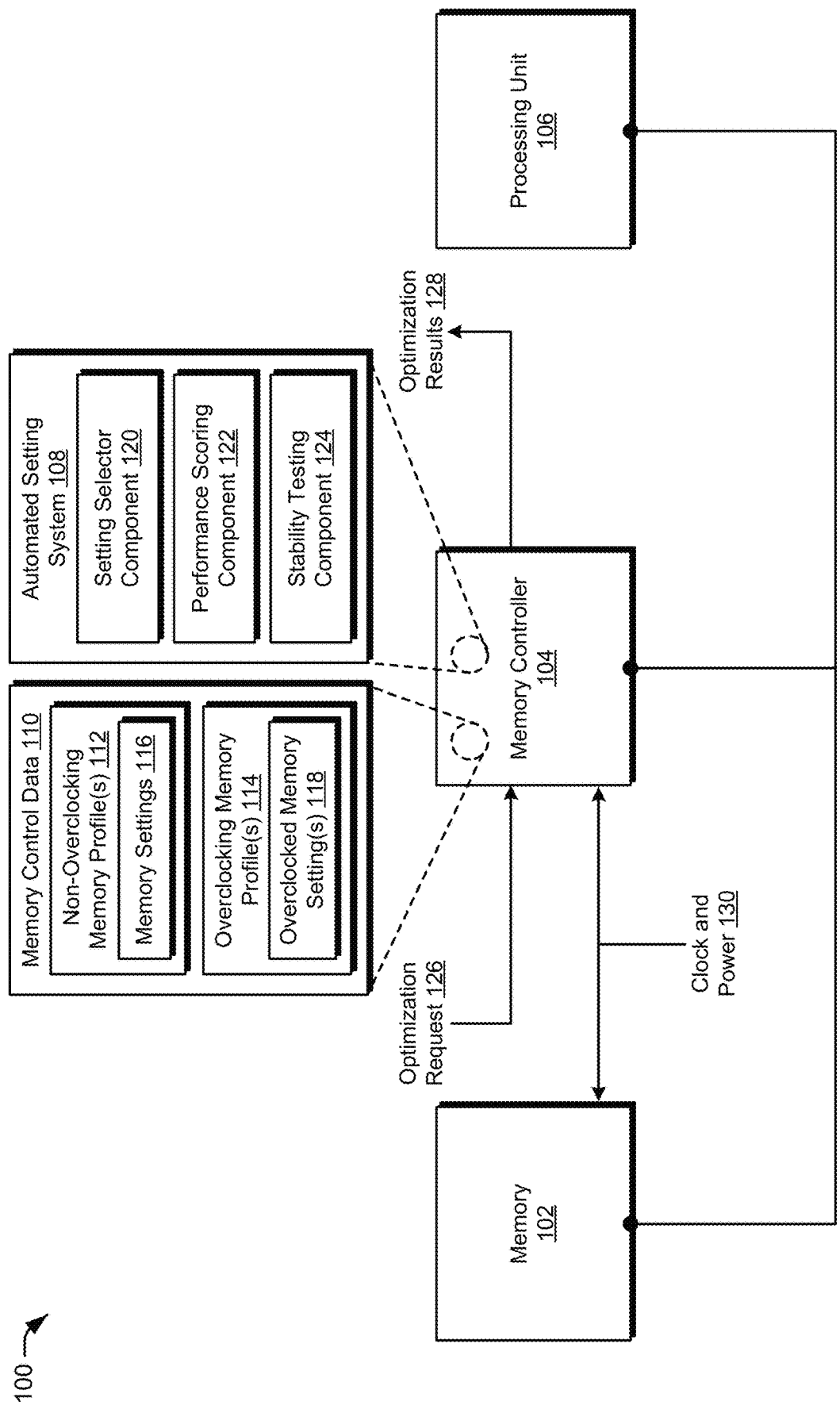
FIG. 1 is a block diagram of a non-limiting example system having a memory and a memory controller operable to implement automated memory overclocking.

Conventional approaches for memory overclocking utilize target memory setting profiles which are often generated based on a "worst case" perspective. Even though these memory setting profiles may be above default memory capabilities, they are still quite conservative and are not customized based on the parameters of specific computing system. Users that wish to further optimize their memory above these default settings are often forced to rely on third party software that generates target setting based on past data. This past data, however, is based on capabilities of other computing systems and does not take into account the hardware capabilities of the specific computing system.

To solve these problems, automated memory overclocking is described. The described techniques automate the process of determining optimized overclocking settings for a computing system. To do so, the describes techniques test both performance and stability of memory settings for operating the memory, such as to test performance and stability of one or more sets of overclocked memory settings. For example, the techniques discussed herein allow various overclocked memory settings to be adjusted and a performance test run using the adjusted overclocked memory settings. In one or more implementations, a memory controller runs the performance test on the memory (e.g., by executing a workload on the memory), which generates performance values using the overclocked memory settings (or using adjusted overclocked memory settings). This process is automatically repeated multiple times for various memory settings and various overclocked values for those memory settings. The performance values generated by running the performance test are used to generate a performance indication that identifies how sensitive performance of the memory is to the one or more overclocked memory settings. The performance indication identifies which one or more overclocked memory settings have the most effect on operation of the memory in relation to a specified optimization that the user is interested in, allowing the user to then focus on simply selecting an optimization, such as increased performance of the memory, reduced power usage, reduced latency, and so forth. This frees a user from needing to guess or take a trial and error approach to determine which of the one or more memory settings to adjust to achieve the optimization that the user desires.

The memory controller also tests a stability of the overclocked memory settings which, according to the one or more performance tests, affect the operation of memory for a specified optimization. This ensures that to achieve the specified optimization, the controller sets the overclocked memory settings set within a range of values that will keep the memory system stable (e.g., within a guardband of the memory's margins). This allows the one or more overclocked memory settings having the most effect on the desired optimization of memory operation system performance to be selected while reducing or eliminating the risk that the selected settings may render the memory system nonfunctional.

In some aspects, the techniques described herein relate to a system including: a memory, a performance scoring component to test overclocked memory settings for the memory and output a performance indication for the overclocked memory settings, a stability testing component to test the overclocked memory settings and output a stability indication that predicts a stability of the memory over time if the memory is configured to operate with the overclocked memory settings, and a setting selector component configured to output optimized overclocked memory settings based on the performance indication output by the performance scoring component and the stability indication output by the stability testing component.

In some aspects, the techniques described herein relate to a system, wherein the setting selector component is further configured to control testing by the performance scoring component and the stability testing component until the optimized overclocked memory settings are determined.

In some aspects, the techniques described herein relate to a system, wherein the setting selector component is further configured to provide the overclocked memory settings to the performance scoring component and the stability testing component for testing.

In some aspects, the techniques described herein relate to a system, wherein the setting selector component is further configured to provide additional overclocked memory settings to the performance scoring component and the stability testing component for testing based on at least one of the performance indication or a predicted stability of the memory.

In some aspects, the techniques described herein relate to a system, wherein the setting selector component is further configured to provide the additional overclocked memory settings to the performance scoring component and the stability testing component for testing responsive to the a prediction indicating that the memory is too unstable if the memory is configured to operate with the overclocked settings, wherein the additional overclocked memory settings provided by the setting selector component are configured to less aggressively overclock the memory than the overclocked memory settings.

In some aspects, the techniques described herein relate to a system, wherein the setting selector component is further configured to provide the additional overclocked memory settings to the performance scoring component and the stability testing component for testing responsive to the a prediction indicating that the memory is stable if the memory is configured to operate with the overclocked settings and the predicted stability falling outside of a marginal stability guardband, wherein the additional overclocked memory settings provided by the setting selector component are configured to more aggressively overclock the memory than the overclocked memory settings.

In some aspects, the techniques described herein relate to a system, wherein the performance scoring component and the stability testing component test the overclocked memory settings during a boot up process of the system.

In some aspects, the techniques described herein relate to a system, wherein the setting selector is further configured to automatically configure the memory to operate with the optimized overclocked memory settings.

In some aspects, the techniques described herein relate to a system, wherein the setting selector component is further configured to output the optimized overclocked memory settings in a user interface.

In some aspects, the techniques described herein relate to a system, wherein the performance scoring component, the stability testing component, and the setting selector component are implemented in a memory controller.

In some aspects, the techniques described herein relate to a method including: selecting one or more sets of overclocked memory settings of a memory for performance testing and stability testing of the memory, testing the one or more sets of the overclocked memory settings for performance of the memory and outputting a performance indication for each of the one or more sets of the overclocked memory settings, testing the one or more sets of the overclocked memory settings for stability of the memory and outputting a stability indication for each of the one or more sets of the overclocked memory settings, and selecting one of the one or more sets of the overclocked memory settings as optimized overclocked memory settings for the memory.

In some aspects, the techniques described herein relate to a method, further including automatically configuring memory to operate with the optimized overclocked memory settings.

In some aspects, the techniques described herein relate to a method, further including outputting the optimized overclocked memory settings in a user interface.

In some aspects, the techniques described herein relate to a method, wherein the user interface includes one or more controls to enable adjustment of the optimized overclocked memory settings.

In some aspects, the techniques described herein relate to a method, wherein the selecting one or more sets of overclocked memory settings of a memory for testing, the testing the one or more sets of the overclocked memory settings for performance of the memory and outputting a performance indication for each of the one or more sets of the overclocked memory settings, the testing the one or more sets of the overclocked memory settings for stability of the memory over time and outputting a stability indication for each of the one or more sets of the overclocked memory settings, and the selecting one of the one or more sets of the overclocked memory settings as optimized overclocked memory settings for the memory occur during a boot up process.

In some aspects, the techniques described herein relate to a computing device including: a memory, and a memory controller to: initiate a boot up process of the computing device to automatically select optimized overclocked memory settings for the memory, and during the boot up process of the computing device: automatically identify one or more sets of overclocked memory settings for testing, test the one or more sets of the overclocked memory settings for performance of the memory and output a performance indication for each of the one or more sets of the overclocked memory settings, test the one or more sets of the overclocked memory settings for stability of the memory and output a stability indication for each of the one or more sets of the overclocked memory settings, and select one of the one or more sets of the overclocked memory settings as the optimized overclocked memory settings.

In some aspects, the techniques described herein relate to a computing device, wherein the memory controller is further configured to automatically configure the memory to operate with the optimized overclocked memory settings.

In some aspects, the techniques described herein relate to a computing device, wherein the memory controller is further configured to output the optimized overclocked memory settings in a user interface.

In some aspects, the techniques described herein relate to a computing device, wherein the user interface enables adjustment of the optimized overclocked memory settings.

In some aspects, the techniques described herein relate to a computing device, wherein the memory controller initiates the boot up process responsive to user input to a user interface to select optimized overclocked memory settings.

FIG. 1 is a block diagram of a non-limiting example system 100 having a memory and a memory controller operable to implement automated memory overclocking. In particular, the system 100 includes memory 102, memory controller 104, and processing unit 106. In accordance with the described techniques, the memory 102, the memory controller 104, and the processing unit 106 are coupled to one another via one or more wired or wireless connections. Example wired connections include, but are not limited to, buses (e.g., a data bus), interconnects, through silicon vias, traces, and planes. Examples of a device or apparatus in which the system 100 is configured for integration include, but are not limited to, servers, personal computers, laptops, desktops, game consoles, set top boxes, tablets, smartphones, mobile devices, virtual and/or augmented reality devices, wearables, medical devices, systems on chips, and other computing devices or systems.

The memory 102 is a device or system that is used to store information, such as for immediate use in a device. In one or more implementations, the memory 102 corresponds to semiconductor memory where data is stored within memory cells on one or more integrated circuits. In at least one example, the memory 102 corresponds to or includes volatile memory, examples of which include random-access memory (RAM), dynamic random-access memory (DRAM), and static random-access memory (SRAM). Alternatively or in addition, the memory 102 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile dual in-line memory module (DIMM) (NVDIMM).

In one or more implementations, the memory 102 is configured as a dual in-line memory module (DIMM). A DIMM includes a series of dynamic random-access memory integrated circuits, and the modules are mounted on a printed circuit board. Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 102 is configured as a small outline DIMM (SO-DIMM) according to one of the above-mentioned SDRAM standards, e.g., DDR, DDR2, DDR3, DDR4, and DDR5. In one or more implementations, the memory 102 is low-power double data rate (LPDDR), also known as LPDDR SDRAM, and is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 102 is configurable in a variety of ways without departing from the spirit or scope of the described techniques.

The memory controller 104 manages the memory 102, including the communication of data to and from the memory 102. For example, the memory controller 104 manages the communication of data to the memory 102 from the processing unit 106 and the communication of data from the memory 102 to the processing unit 106, e.g., over a coupling between the memory 102 and the processing unit 106. As discussed above and below, the memory controller 104 also tests (e.g., during a boot up process) performance and stability of settings (e.g., clock and/or power settings) according to which the memory 102 is or can be configured to operate. In at least one variation, such settings are specified in one or more memory profiles.

The processing unit 106 is a component that requests access to data from the memory 102 for performing one or more operations in relation to such data, e.g., in connection with executing an application (not shown). Examples of the processing unit include, but are not limited to, a central processing unit, a parallel accelerated processor (e.g., a graphics processing unit), a digital signal processor, a hardware accelerator, a microcontroller, a processing-in-memory (PIM) component, and a system on chip. In variations, different types of processing units are useable in the system in accordance with the described techniques.

In the illustrated example, the memory controller 104 is depicted having an automated setting system 108 and memory control data 110. The automated setting system 108 is depicted including various components, which are discussed in more detail below. It is also to be appreciated that the automated setting system 108 (and/or one or more of its components) is not included in the memory controller 104 and is implemented remotely from the memory controller 104. The memory control data 110 includes one or more non-overclocking memory profiles 112 and one or more overclocking memory profiles 114. The non-overclocking memory profiles 112 are implemented using memory settings 116 whereas the overclocking memory profiles 114 are implemented using overclocked memory settings 118.

In accordance with the described techniques, the overclocked memory settings 116 include at least one memory setting that is overclocked. In one or more scenarios, not all memory settings of an overclocking memory profile 114 are overclocked. In other scenarios, however, all the memory settings of an overclocking memory profile 114 are overclocked. In one or more implementations, a memory setting that is "overclocked" exceeds a certified value of the setting. For example, a clock rate set to exceed the clock rate certified by a manufacturer of the memory 102 is "overclocked." By contrast, a memory setting that is not "overclocked" does not exceed the certified value of the setting, e.g., a clock rate that is not "overclocked" does not exceed the clock rate certified by a manufacturer of the memory 102. Broadly, use of overclocked memory setting(s) 118 and/or use of an overclocking memory profile 114 enables the memory 102 to operate in an overclocking mode.

In one or more implementations, the memory settings 116 and the overclocked memory settings 118 include various clock and/or power settings. Example settings include, but are not limited to, a data rate (e.g., megatransfers per second), a number of cycles between sending a column address to memory and the beginning of data in a response (e.g., CAS or tCAS), a minimum number of clock cycles to open a row and access a column (e.g., tRCD), a measure of latency between issuing a precharge command to idle or close open row and an activate command to open a different row (e.g., tRP), a minimum number of clock cycles between a row active command and issuing a precharge command (e.g., tRAS), an active to active delay time within the same bank group (e.g., tRRDL), an active to active delay time to a different bank group (e.g., tRRDS), a four active window time (e.g., tFAW), a write recovery time (e.g., tWR), a column address strobe (CAS) latency time (e.g., tAA), an active to active/refresh delay time (e.g., tRC), a refresh recovery delay time in a normal refresh mode (tRFC1), a refresh recovery delay time in a fine granularity refresh mode (tRFC2), a refresh recovery delay time in a same bank refresh mode (tRFCs), a write to read command delay second within a same bank group (tWTRL), a write to read command delay second within a different bank group (tWTRS), a read to precharge delay (tRTP), nominal power supply voltage (e.g., VDD), output stage drain power voltage (e.g., VDDQ), programming power voltage (e.g., VPP), and so forth. It is to be appreciated that the memory settings 116 and/or the overclocked memory settings 118 specify values for one or more of those settings and/or various other settings associated with operating memory without departing from the spirit or scope of the described techniques.

In accordance with the described techniques, the automated setting system 108 of the memory controller 104 and/or another component of the system 100 (e.g., the physical layer (PHY)) is configured to test performance and stability of memory settings for operating the memory 102, such as such as to test performance and stability of the memory settings 116 of one or more non-overclocking memory profiles 112 and/or the overclocked memory settings 118 of one or more overclocking memory profiles 114. For example, the automated setting system 108 tests performance of the memory settings to determine which memory settings, if adjusted, most affect operation of the memory 102 to achieve one or more optimization objectives, e.g., optimized performance of the memory 102, reduced power usage by the memory 102, reduced latency of the memory 102, and so forth. The automated setting system 108 also tests a stability of memory settings, such by testing a stability of one or more overclocked values of the memory settings that have been identified to most affect the operation of the memory 102 in connection with achieving one or more specified optimization objectives. The automated setting system 108 tests the performance and stability of such memory settings during a boot up phase of the system 100. In one or more implementations, the automated setting system 108 performs iterations of testing one or more sets of overclocked memory settings 118 for performance and testing one or more sets of overclocked memory settings 118 for stability. In at least one variation, all sets of overclocked memory settings that were performance tested are also stability tested. However, in at least one other variation, fewer than all the sets of overclocked memory settings that were performance tested are also stability tested. Rather than stability testing all the sets, for instance, a subset of sets of the overclocked memory settings that were performance tested are also stability tested, such as sets of the overclocked memory settings having performance values indicating that they sufficiently affect (e.g., above a threshold) operation of the memory to achieve one or more optimization objectives.

In this example, the automated setting system 108 is depicted including a setting selector component 120, a performance scoring component 122, and a stability testing component 124. In variations, these components are configured as firmware or intellectual property (IP) cores run on or otherwise accessible to the memory controller 104. Alternatively, one or more of those components are implemented in hardware. Although depicted as part of the memory controller 104, in one or more implementations, the automated setting system 108 and/or one or more of the setting selector component 120, the performance scoring component 122, and the stability testing component 124 are implemented remotely from the memory controller 104. Additionally or alternatively, the automated setting system 108 includes more, fewer, or different components in variations to implement the described techniques.

The illustrated example also includes an optimization request 126. As discussed in more detail below, in one or more implementations, the optimization request 126 is received. For instance, the optimization request 126 is received responsive to user input selecting an option via a user interface to optimize the memory 102. In at least one variation, such a user interface presents (e.g., displays) one or more optimization objectives from which a user can select for optimizing the memory 102, examples of which include optimizing for performance of the memory 102 (e.g., increase a number read/write accesses handled, increase a frequency at which read/write accesses are handled, etc.), optimizing for power usage by the memory 102, optimizing for latency of the memory 102, and performing a default optimization in which one or more optimizations are weighted/combined to achieve an overall optimization, to name just a few.

In one or more implementations, therefore, the optimization request 126 includes or otherwise indicates specified optimizations. Although it is discussed that user input triggers the optimization request 126, in at least one variation, the optimization request 126 is triggered by an application, such as when the application is launched, installed, or updated, for instance. Responsive to the optimization request 126, the system 100 is powered down and then a boot up process is performed, during which overclocked memory settings are performance- and stability-tested (e.g., iteratively) by the memory controller 104 and/or one or more of its various components.

In at least one variation, the setting selector component 120 selects one or more sets of the settings that are to be performance tested by the performance scoring component 122 and stability tested by the stability testing component 124. By way of example, the setting selector component 120 selects at least a first set of overclocked memory settings 118 to be tested. In one or more scenarios, after this first set is tested, the setting selector component 120 selects at least a second set of overclocked memory settings 118 (e.g., a next set) to be tested based on a performance indication and stability indication generated in connection with testing the first set.

In one or more implementations, the setting selector component 120 selects a next set of overclocked memory settings 118 to test until the performance indication and stability indication satisfy one or more thresholds and/or ranges. By way of example and not limitation, a next set of settings is selected and iterations of performance- and stability-testing are performed until the performance indication of a set of settings satisfies a threshold performance (or threshold improvement) and the stability indication of the set of settings falls within a marginal stability range (e.g., which indicates that operation of the memory 102 is "stable enough" if operated according to the set of settings). In one or more implementations, a marginal stability range is based on identifying values of settings that cause unstable operation of the memory 102 and buffering (e.g., with a guardband) those values so that the overclocked memory settings are not set to values within the buffer (or at determined unstable levels) causing unstable operation of the memory 102. Further, the marginal stability range is within a threshold stability of the guardband. Thus, in one or more variations, the guardband defines a lowest level of stability for the marginal stability range, and the threshold stability added to the guardband defines a highest level of stability for the marginal stability range. In one or more implementations, the setting selector component 120 causes a next set of settings to be selected if the tested set is "not stable enough" (e.g., the stability indication reaches unstable levels or falls within the guardband of the unstable levels).

In at least one variation, during the boot up process of the system 100, the performance scoring component 122 tests performance of overclocked memory settings 118 for operating the memory 102 in accordance with the following discussion. The performance scoring component 122 runs the performance test with at least one set of the overclocked memory settings 118 and makes various read and write requests to the memory 102. As noted above and below, in one or more variations, the performance test run by the performance scoring component 122 includes or otherwise corresponds to running one or more workloads with the memory 102. For instance, different workloads are designed to test performance of the memory 102 in relation to different optimizations and generate performance values that identify settings which achieve (or improve performance toward) such optimizations, such as latency of the memory 102, bandwidth of the memory 102, power usage of the memory 102 (e.g., battery life for a notebook or other portable device, power for performance per watt calculations for a desktop computer), and so forth. When run on the memory 102, a workload generates one or more performance values, which are provided to the performance scoring component 122 (or recorded by it).

The performance scoring component 122 evaluates these performance values and generates a performance indication indicating how sensitive performance of the memory 102 is to the one or more memory settings tested. The performance indication is output to any of various different devices or entities. For instance, the performance indication is output to the setting selector component 120 and/or the stability testing component 124 to use the performance indication to determine automatically (e.g., without user input) which memory setting values to adjust in order to improve performance of memory 102 (e.g., overclock the memory 102 to achieve one or more optimization objectives). In at least one implementation, the performance indication is output via display device (e.g., after the system 100 finishes the boot up process), which allows a user to see which memory settings affect (have the most effect and least effect on) achieving an optimization. Additionally or alternatively, an indication derived from the performance indication, that shows general sensitivity of the memory to one or more memory settings that were changed (e.g., a grade, a heatmap, and so forth as discussed in more detail below), is output to a display device or another application or system.

In one or more implementations, the performance scoring component 122 adjusts one or more of multiple different memory settings multiple times, and the one or more workloads run during the performance test generate the one or more performance values for new overclocked memory settings 118 (or a set of them) after each adjustment. This allows the performance scoring component 122 to generate one or more performance indications identifying which overclocked memory settings 118 the memory 102 is most (and least) sensitive to for the workload(s) run during the performance test.

It should be noted that although a single workload may be run as part of the performance testing performed by the performance scoring component 122, in one or more implementations, the performance scoring component 122 runs more than one workload. In one or more implementations, the performance scoring component 122 generates one or more performance indications for each different workload. Additionally or alternatively, the performance scoring component 122 generates one or more generic or combined performance indications for the multiple different workloads.

By determining through the performance testing which particular memory settings, if overclocked, affect the memory 102 (e.g., most or least) in terms of achieving an optimization objective, the stability testing can then be used to determine how much those memory settings can be adjusted (e.g., overclocked) and maintain operation of the memory 102 within a stable range, e.g., within a marginal stability.

In at least one variation, the stability testing component 124 tests a stability of a set of the overclocked memory settings 118 for operating the memory 102 (e.g., an overclocking memory profile 114) during a boot up process of the system 100. For example, the setting selector component 120 specifies a set of overclocked memory settings 118 to stability test based on previous performance testing. For instance, the setting selector component 120 specifies the set of settings during the boot up process, e.g., during which the set of settings were previously performance tested by the performance scoring component 122. During the boot up process of the system 100, the stability testing component 124 of the memory controller 104 also tests the stability of the overclocked memory settings 118. In at least one variation, the stability testing component 124 performs one or more initial stability tests on the set of overclocked memory settings 118, and one or more additional stability tests if the memory settings "pass" the initial stability tests, e.g., the settings are indicated stable or at least marginally stable via the initial stability tests.

After performing one or more stability tests on the memory 102, one or more stability indications are returned, e.g., to the setting selector component 120. Using the one or more stability indications, the setting selector component 120 determines whether to conduct a subsequent iteration of performance- and stability-testing or proceed to operating the memory 102 using the tested settings. In the scenario where the setting selector component 120 determines to proceed by operating the memory 102 using the tested memory settings, optimization results 128 are returned which indicate the selected set of overclocked memory settings 118, e.g., optimized overclocked memory settings. In at least one variation, the memory controller 104 causes one or more change signals to be sent to change operation of the memory 102 so that it operates according to the overclocked memory settings 118 included in the optimization results 128. In this way, the memory controller 104 automatically tests various combinations of overclocked memory settings and automatically selects a set of the overclocked memory settings for operating the memory 102 to optimize performance of the memory 102 for achieving at least one optimization objective. As used herein "automatically test" refers to performance- and stability-testing various combinations of settings and their values without receiving user input to select which particular memory settings to test or at what values to test them, and "automatically" select refers to selecting values at which to set the overclocked memory settings without receiving user input specifying how to specifically set them.

In one or more implementations, human-understandable information indicative of the optimization results 128 (e.g., one or more descriptions of the settings adjusted and their adjusted values) is presented (e.g., displayed) via a user interface. Generally, results of the one or more stability tests predict a stability of the memory 102 over a subsequent time period if the memory 102 is configured to operate with the set of overclocked memory settings. Alternatively or in addition, the memory controller 104 is configured to test stability of the settings for operating the memory 102 during a different phase from the boot-up phase, such as while the system 100 is in a "sleeping" state.

In one or more implementations, the stability testing component 124 performs one or more stability tests of the memory 102 during the boot up phase—it is to be appreciated that the stability tests described above and below are performable by the stability testing component 124 and/or another component in variations, even if described herein as being performed by the memory controller 104. The performed tests are configured to test a stability of at least one set of memory settings (e.g., a set of overclocked memory settings selected or adjusted by the setting selector component 120), such as a stability of the memory 102 to operate using the at least one set of memory settings. By way of example, during training of the memory 102, the stability testing component 124 determines stable margins for bit-lines of the memory 102 to operate and uses those margins to determine optimal settings for initializing the hardware. In accordance with the described techniques, the stability testing component 124 also uses the stable margins to determine stability of the memory 102 for a subsequent period of time, e.g., hardware stability in the long term.

Examples of the one or more tests the stability testing component 124 and/or other component perform on the memory 102 during boot up to test the stability of the memory 102 under various settings include, but are not limited to, performing reference voltage (Vref) and/or delay-locked loop (DLL) shmoos (e.g., to generate one or more "eye diagrams" of the memory 102 or portions of the memory 102), performing virtual timing and signal analysis (vTSA), adjusting different voltage and/or delay levels to generate visualization of memory data eyes for different bits of the memory, checking one or more portions of the memory 102 for rowhammering, and performing one or more RSC tests. In one or more implementations, the stability testing component 124 generates one or more eye diagrams of the memory 102 using a combination (e.g., a multidimensional combination) of reference voltage (Vref) and DLL shmoos. In at least one variation, the reference voltage (Vref) is shmooed to determine if the signal is a '1' or a '0' in connection with creating the memory eye diagrams. Based on the generated eye diagrams, for instance, the stability testing component 124 obtains the margins at which the memory 102 is capable of performing given variations in the environment in which the memory 102 operates. In variations, different tests are performed to test the stability of the memory 102 without departing from the described techniques.

By way of contrast to the described stability testing techniques, conventional approaches involve running one or more "stress tests" using software, such as via an operating system. Such tests can take several hours (up to days) to determine a stability of the system. This is at least in part because the conventional tests are performed via software, which involves access (e.g., by an operating system) via one or more cores (of a processing unit), then access via data fabric of the system, and then access to the memory being stress tested—a slower path than a direct path to memory. Additionally, conventional stress tests are limited to determining the stability of the system for the environmental variables and workload at a time those tests are performed, but the tests do not guarantee that the system will perform stably in the long term, especially if operation of the memory approaches its margins.

In accordance with the described techniques, the stability testing component 124 (e.g., as part of the memory controller 104) accesses the memory 102 directly. In other words, the stability tests are run from the memory controller 104 directly into the memory 102. As a result, the stability tests performed on the memory 102 to determine a stability of the overclocked memory settings 118 are faster than conventional stress tests. In order to perform one or more of the tests during boot up, the stability testing component 124 bypasses refreshes and other periodic background activities, which is unable to be performed in various scenarios where the system has already been booted up (e.g., when running software). Additionally, by performing the performance—and stability—tests during boot up by directly accessing the memory 102, the performance scoring component 122 and the stability testing component 124 avoid background latencies that occur with operating systems and/or other software after the system has booted up.

The illustrated example also depicts clock and power 130 inputs to the memory 102 and the memory controller 104. In accordance with the described techniques, the memory controller 104 and/or another component is configured to set the clock and power 130 inputs to cause the memory 102 to operate according to a set of memory settings, such as a set of overclocked memory settings 118 indicated in the optimization results 128 or of an overclocked memory profile 114.

For example, the memory controller 104 causes the memory 102 to operate according to a set of the overclocked memory settings 118 by sending one or more change signals to a voltage generator (not shown) to adjust a supply voltage (e.g., VDD), such that the clock and power 130 inputs subsequently include the supply voltage as adjusted according to the change signals. Additionally or alternatively, the memory controller 104 sends a change signal to a reference clock generator (not shown) to change a frequency of a clock rate, such that the clock and power 130 inputs subsequently include a reference clock signal as adjusted according to the change signals. The memory controller 104 is operable to adjust the clock and power 130 inputs in various ways to produce the settings specified, e.g., in the optimization results 128, for operating the memory 102.

Figure 2:
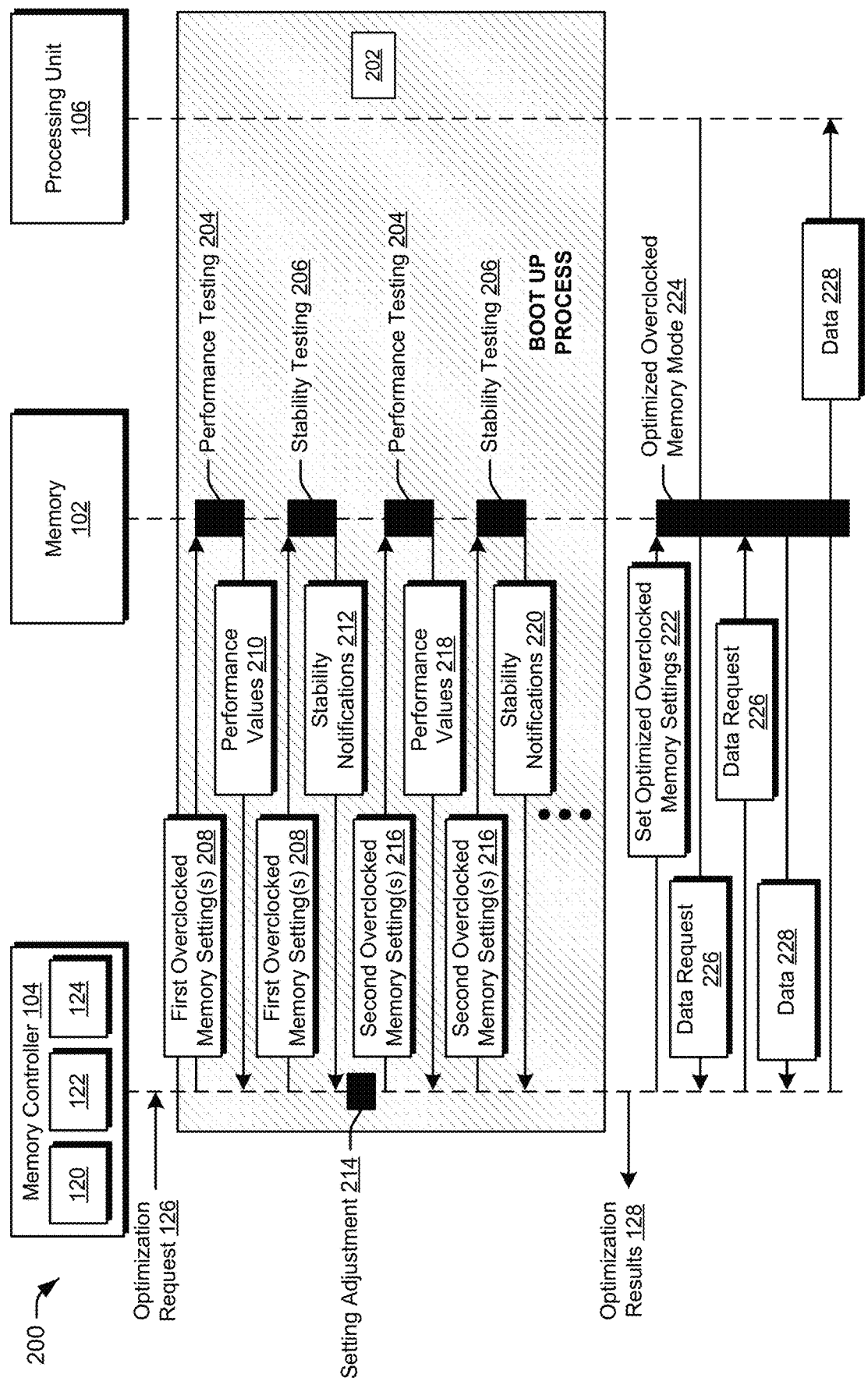
FIG. 2 depicts a non-limiting example in which performance and stability of memory settings is tested as part of automating overclocking of memory.

FIG. 2 depicts a non-limiting example 200 in which performance and stability of memory settings is tested as part of automating overclocking of memory. The example 200 includes from FIG. 1 the memory 102, the memory controller 104, and the processing unit 106. Further, the memory controller 104 is depicted including the setting selector component 120, the performance scoring component 122, and the stability testing component 124. Although depicted as including these components, it is to be appreciated that in one or more implementations the memory controller 104 (or some other component) is considered to perform the operations described herein as being performed by the setting selector component 120, the performance scoring component 122, and/or the stability testing component 124.

The example 200 includes a variety of example communications and operations between the memory controller 104, the memory 102, and the processing unit 106 over time. In this example 200, the communications and operations are positioned vertically based on time, such that communications and operations closer to a top of the example occur prior to communications or operations further from the top of the example. It follows also that communications or operations closer to a bottom of the example occur subsequent to communications or operations further from the bottom. The example 200 also depicts various phases and/or states of the system 100 or portions of the system 100. These phases and/or states are also positioned in the example 200 vertically based on time, such that phases or states closer to a top of the example occur prior to phases, states, or communications further from the top.

Here, the illustrated example 200 depicts the memory controller 104 receiving the optimization request 126. In one or more implementations, the optimization request 126 is received based on user input, such as user input received via a displayed control (e.g., a button) to optimize operation of the memory 102. As discussed above and below, in variations, the described system optimizes operation of the memory 102 to achieve an optimization objective, such as optimized performance of the memory 102, reduced power usage by the memory 102, reduced latency of the memory 102, and so forth.

The illustrated example 200 also depicts a boot up phase 202 of the system 100. In one or more implementations, the system 100 enters the boot up phase 202 based on receipt of the optimization request 126. Although a powered off phase is not depicted, in one or more such implementations, the system 100 is powered off based on the optimization request 126, and then the system 100 is triggered to boot up. During a powered off phase, the system 100 (and the memory 102) is powered off, examples of which include a soft off (e.g., G2/S5 state as specified by Advanced Configuration and Power Interface (ACPI)) and a mechanical off (e.g., G3 state as specified by ACPI), which require a reboot to return to a working state (e.g., G0/S0 state as specified by ACPI). During the boot up phase 202, the system 100 performs various operations, such as hardware initializations, to advance the system 100 to a working state.

In accordance with the described techniques, the boot up phase 202 includes performance testing 204 and stability testing 206 of the memory 102. Broadly, the setting selector component 120 controls testing by the performance scoring component 122 and the stability testing component 124 until optimized overclocked memory settings are determined. As part of this, for instance, the memory controller 104 (e.g., the setting selector component 120) selects first overclocked memory settings 208 for performance testing 204 and stability testing 206. The memory controller 104 (e.g., the performance scoring component 122) tests a performance of the first overclocked memory settings 208 for operating the memory 102. In one or more implementations, the performance scoring component 122 performs the performance testing 204, at least in part, by running one or more workloads with the memory 102 that involve various read and/or write accesses to the memory 102.

As the performance scoring component 122 performs the performance testing 204 on the memory 102, one or more workloads that are run as part of the testing generate performance values 210, which describe performance of the memory 102 in terms of completing one or more memory-based tasks or operations, when configured according to the first overclocked memory settings 208. The performance values 210 are then used individually or in combination to produce one or more performance indications for the first overclocked memory settings 208.

Additionally, the memory controller 104 (e.g., the stability testing component 124) tests a stability of the first overclocked memory settings 208 for operating the memory 102. As part of the stability testing 206, in one or more implementations, the stability testing component 124 tests a stability of operating the memory 102 with the first overclocked memory settings 208 by performing reference voltage (Vref) and/or delay-locked loop (DLL) shmoos and/or by generating one or more "eye diagrams" of the memory 102 or portions of the memory 102. Based on the stability testing 206, for instance, the memory controller 104 obtains the margins at which the memory 102 is capable of performing.

As the stability testing component 124 performs the stability testing 206 on the memory 102, the memory controller 104 (e.g., the setting selector component 120 and/or the stability testing component 124) receives stability notifications 212 (e.g., signals), which indicate a response of the memory 102 to the stability tests performed during the boot up phase 202. For instance, as the stability testing component 124 performs reference voltage (Vref) and/or DLL shmoos in the memory 102, the memory controller 104 receives stability notifications 212 indicative of operation of the memory 102 and/or margins of its operation, under various combinations of voltage and/or delay levels.

In one or more scenarios, the setting selector component 120 causes a next set of overclocked memory settings 118 to be tested, e.g., with the performance testing 204 and the stability testing 206. As mentioned above and below, for instance, the setting selector component 120 controls testing by the performance scoring component 122 and the stability testing component 124 until optimized overclocked memory settings are determined. By way of example, the setting selector component 120 selects an additional set of overclocked memory settings that less aggressively overclock the memory 102 than the first overclocked memory settings 208, such as in a scenario where the stability notifications 212 are processed to generate a prediction that the memory 102 is too unstable if configured to operate with the first overclocked memory settings 208. Alternatively, the setting selector component 120 selects an additional set of overclocked memory settings that more aggressively overclock the memory 102 than the first overclocked memory settings 208, such as in a scenario where the stability notifications 212 are processed to generate a prediction that the memory 102 is stable if configured to operate with the first overclocked memory settings 208 and the predicted stability falls outside of a marginal stability range (i.e., the first overclocked memory settings 208 are "too stable"). In other words, the setting selector component 120 performs a setting adjustment 214 on the first overclocked memory settings 208, adjusting them to produce second overclocked memory settings 216, which are different from the first overclocked memory settings 208.

The memory controller 104 (e.g., the setting selector component 120) then provides the second overclocked memory settings 216 for performance testing 204 and stability testing 206. The memory controller 104 (e.g., the performance scoring component 122) tests a performance of the second overclocked memory settings 216 for operating the memory 102. By way of example, the performance scoring component 122 performs the performance testing 204 on the second overclocked memory settings 216, at least in part, by running one or more workloads with the memory 102 that involve various read and/or write accesses to the memory 102. As the performance scoring component 122 performs the performance testing 204 using the second overclocked memory settings 216, one or more workloads that are run as part of the testing generate performance values 218, which describe performance of the memory 102 in terms of completing one or more memory-based tasks or operations when configured according to the second overclocked memory settings 216. The performance values 218 are then used individually or in combination to produce one or more performance indications for the second overclocked memory settings 216.

Further, the memory controller 104 (e.g., the stability testing component 124) tests a stability of the second overclocked memory settings 216 for operating the memory 102. As part of the stability testing 206, in one or more implementations, the stability testing component 124 tests a stability of operating the memory 102 with the second overclocked memory settings 216 by performing reference voltage (Vref) and/or delay-locked loop (DLL) shmoos and/or by generating one or more "eye diagrams" of the memory 102 or portions of the memory 102. Based on the stability testing 206, the memory controller 104 obtains the margins at which the memory 102 is capable of performing, when configured according to the second overclocked memory settings 216.

As the stability testing component 124 performs the stability testing 206 on the memory 102 for the second overclocked memory settings 216, the memory controller 104 (e.g., the setting selector component 120 and/or the stability testing component 124) receives stability notifications 220 (e.g., signals), which indicate a response of the memory 102 to the stability tests performed during the boot up phase 202, e.g., if the memory 102 is configured according to the second overclocked memory settings 216. For instance, as the stability testing component 124 performs reference voltage (Vref) and/or DLL shmoos in the memory 102, the memory controller 104 receives stability notifications 220 indicative of operation of the memory 102 with the second overclocked memory settings 216 and/or margins of its operation, under various combinations of voltage and/or delay levels.

The illustrated example 200 depicts ellipses in the boot up phase 202 to indicate that in variations the setting selector component 120 performs more than two iterations of selecting a set of settings, performance testing 204 the set of settings, stability testing 206 the set of settings, and adjusting those settings to produce a next set of settings for testing. As noted above, for instance, the setting selector component 120 controls testing by the performance scoring component 122 and the stability testing component 124 until optimized overclocked memory settings are determined.

Responsive to determination of optimized overclocked memory settings, the optimization results 128 are output. In one or more implementations, the optimization results 128 include or otherwise indicate the optimized overclocked memory settings. In at least one variation, the memory controller 104 (e.g., the setting selector component 120) outputs the optimization results 128, which causes the memory 102 to operate according to the optimized overclocked memory settings. For example, the memory controller 104 causes the memory 102 to operate according to the optimized overclocked memory settings by sending one or more change signals to a voltage generator (not shown) to adjust a supply voltage (e.g., VDD), such that the clock and power 130 inputs subsequently include the supply voltage as adjusted according to the change signals. Additionally or alternatively, the memory controller 104 sends a change signal to a reference clock generator (not shown) to change a frequency of a clock rate, such that the clock and power 130 inputs subsequently include a reference clock signal as adjusted according to the change signals.

Additionally or alternatively, the memory controller 104 outputs the optimization results 128 by communicating them to software (e.g., via a handshake), such as to an operating system (not shown). Alternatively or additionally, an operating system further provides the test results to an application running on the operating system, such as to a memory management application. In accordance with the described techniques, the optimization results 128 are output (e.g., displayed) in a human-understandable format via a user interface, such as via a user interface of an operating system and/or a user interface of a memory management application. Examples of formats in which the optimization results 128 are output include, but are not limited to, numerical scores, stop-light icons, text labels describing hierarchical levels of optimization, graphical icons, graphs or charts depicting a performance and/or stability of the memory over time if the memory is configured to operate with the optimized overclocked memory settings, and one or more visualizations of generated eye diagrams, to name just a few. In variations, the optimization results 128 are output in different human-understandable ways indicative of performance and/or stability of the memory 102 under tested settings without departing from the spirit or scope of the described techniques.

Also in this example 200, the memory controller 104 provides one or more set optimized overclocked memory settings 222 signals to the memory 102 to cause the memory 102 to operate according to an optimized overclocked memory mode 224. By selecting optimized overclocked memory settings through iterations of the performance testing 204 and the stability testing 206, the described techniques automate memory overclocking so that memory overclocking can be performed without user input specifying values for overclocking one or more memory settings. In accordance with the described techniques, the memory controller 104 causes the memory 102 to operate according to the optimized overclocked memory mode 224, such as subsequent to having operated according to a different mode, e.g., a non-optimized mode, an overclocked memory mode optimized for a different optimization objective (e.g., performance versus power usage), or an overclocked memory mode where one or more of the settings were overclocked based on user input, to name just a few.

Additionally or alternatively, the optimization results 128 can include or be used to generate a recommendation for output. In one variation, for instance, such a recommendation recommends that a user select an optimization objective or combination of optimization objectives and allow the system 100 to automatically select overclocked memory settings to achieve those objectives. By way of example, a software application (e.g., a memory management application) creates and causes output (e.g., display) of a notification after a threshold amount of time (e.g., a number of hours, days, months, etc.) reminding a user of the system 100 to select an optimization objective and allow the system to automatically optimize overclocked memory settings to achieve the optimization.

In this example 200, the memory 102 is also depicted receiving data requests 226 originating from the processing unit 106 and providing data 228 to the processing unit 106 for servicing those requests, in accordance with the described techniques. In particular, the memory controller 104 receives one or more data requests 226 from the processing unit 106 and the memory controller 104 schedules the data request 226 to the memory 102. The memory controller 104 then accesses (e.g., reads from) a portion of the memory 102 corresponding to the data request 226 (e.g., to retrieve respective data 228). The memory controller 104 then provides the respective data 228 to the processing unit 106. This process of requesting data, retrieving data from the memory 102 (e.g., reading the data from the memory 102), and providing the data read back to the processing unit 106, is performed while the memory 102 operates according to the optimized overclocked memory mode 224. In accordance with the described techniques, the processing unit 106 can also cause the memory controller 104 to write data to the memory 102 while operating in the optimized overclocked memory mode 224.

Notably, by performing the stability testing on the automated overclocking settings, the memory controller 104 is able to determine the stability expectations of the system. Thus, in one or more implementations, after the automated memory overclocking is performed, the memory controller 104 can inform the user after a certain time period that the stability tests should be run again to ensure that the automated memory overclocking settings are still stable.

Figure 3:
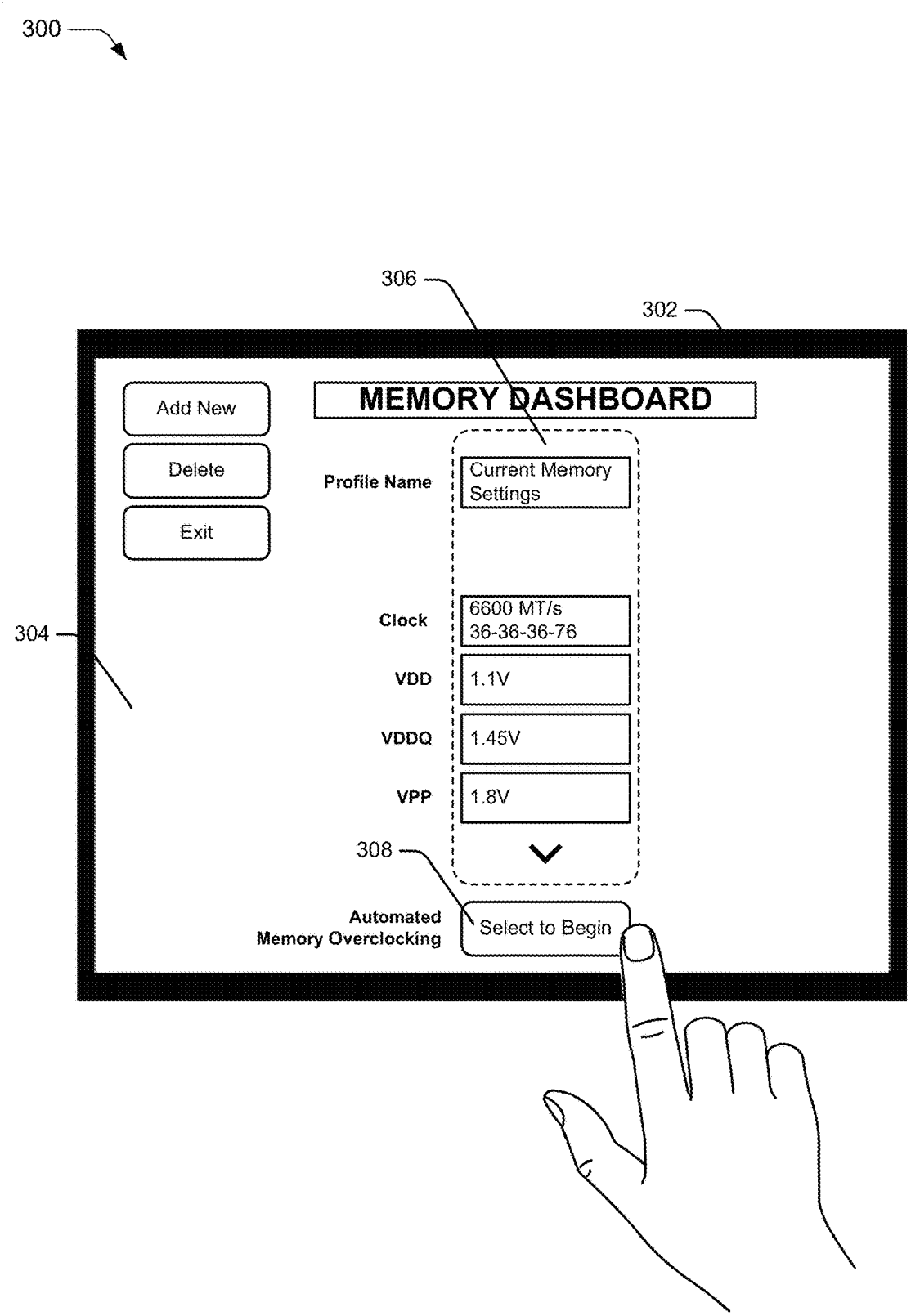
FIG. 3 depicts a non-limiting example of a user interface in one or more implementations.
Figure 4:
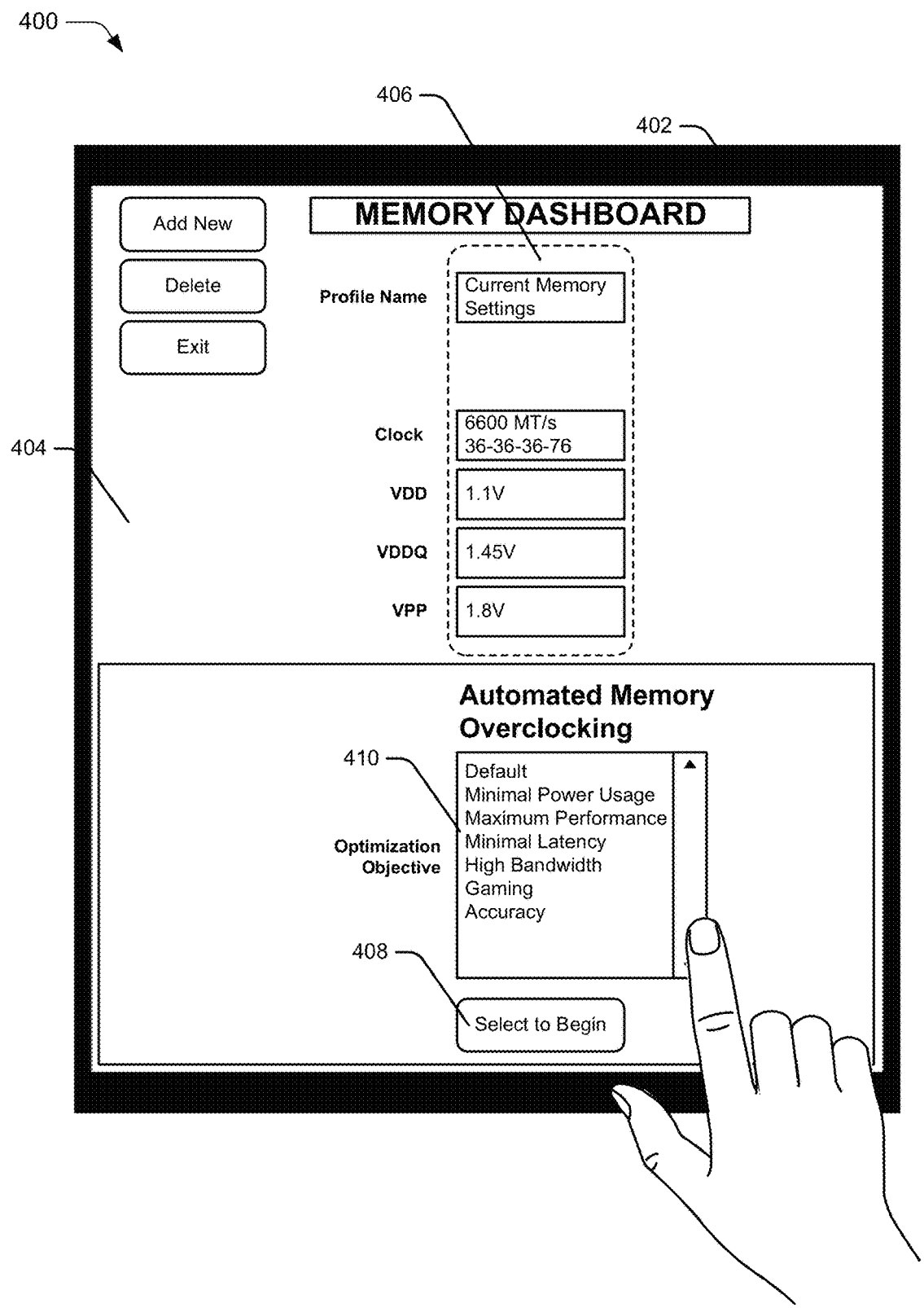
FIG. 4 depicts a non-limiting example of a user interface in one or more implementations.
Figure 5:
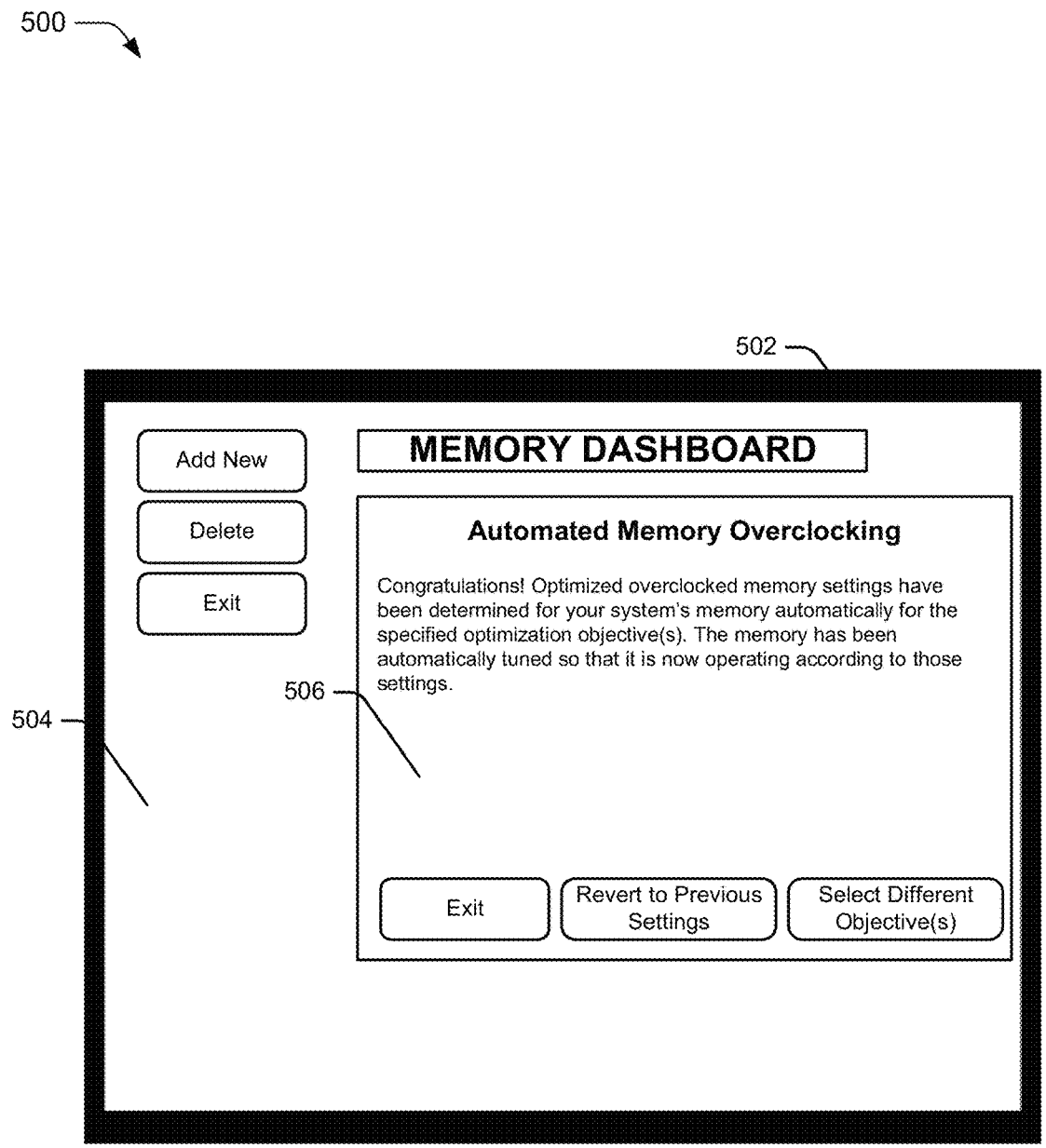
FIG. 5 depicts a non-limiting example of a user interface in one or more implementations.

In the context of user interfaces for automated memory overclocking, consider the following discussion of FIGS. 3-5.

FIG. 3 depicts a non-limiting example 300 of a user interface in one or more implementations. The example 300 includes a display device 302 outputting a memory overclocking user interface 304.

In the illustrated example 300, the user interface 304 is depicted displaying a set of memory settings 306 according to which the memory 102 is operable. In this example 300, the user interface 304 includes a control 308, which is selectable (e.g., via user input) to initiate automated overclocking of the memory 102. For instance, receipt of user input in relation to the control 308 corresponds to or triggers the optimization request 126, which causes the system 100 to automatically select optimized overclocked memory settings for operating the memory 102. This includes performing the performance testing 204 and the stability testing 206 for one or more sets of settings selected by the setting selector component 120 during the boot up phase 202 until optimized overclocked memory settings are determined.

In one or more implementations, the user interface 304 allows a user to provide user input to adjust one or more settings according to which the memory 102 operates.

Additionally or alternatively, the user interface 304 includes controls which allows a user to select to initiate performance testing 204 of such user selected settings and/or stability testing 206 of the user selected settings. Indeed, it is to be appreciated that in variations, user interfaces for automated memory overclocking are configured in different ways without departing from the spirit or scope of the described techniques.

FIG. 4 depicts a non-limiting example 400 of a user interface in one or more implementations. The example 400 includes a display device 402 outputting a memory overclocking user interface 404.

Like the illustrated example 300, the illustrated example 400 depicts the user interface 404 displaying a set of memory settings 406 according to which the memory 102 is operable. Also like the example 300, the user interface 404 in the example 400 includes a control 408, which is selectable (e.g., via user input) to initiate automated overclocking of the memory 102. In contrast to the user interface 304, however, the user interface 404 further includes an optimization control 410 for selecting one or more optimization objectives. For instance, receipt of user input in relation to the control 410 specifies one or more optimization objectives in one or more scenarios. Examples of such optimizations are described in more detail above. In one or more implementations, specification of one or more such optimizations causes the optimization request 126 to include such optimizations so that the memory controller 104 determines optimized overclocked memory settings based on the specified optimizations included in the optimization request 126. In one or more implementations, the user interface 404 includes additional controls which enable the user to select specific settings for automated memory overclocking. For example, the user interface 404 may include a control which enables navigation to an additional customization menu whereby users can specify exact setting to automatically overclock.

Thus, in one example, receipt of user input in relation to the control 408 triggers generation of the optimization request 126 so that the optimization request 126 is generated to include one or more specified optimization objectives, e.g., objectives specified based on user input via the optimization control 410. In accordance with the described techniques, the optimization request 126 then causes the system 100 to automatically select optimized overclocked memory settings for operating the memory 102. This includes performing the performance testing 204 and the stability testing 206 for one or more sets of settings selected by the setting selector component 120 during the boot up phase 202 until optimized overclocked memory settings are determined.

FIG. 5 depicts a non-limiting example 500 of a user interface in one or more implementations. The example 500 includes a display device 502 outputting a memory overclocking user interface 504.

In the illustrated example 500, the user interface 504 is depicted displaying a notification 506 indicating that optimized overclocked memory settings have been determined (e.g., by the setting selector component 120, the performance scoring component 122, and the stability testing component 124 during the boot up phase 202), and the memory 102 has been adjusted to operate according to the optimized overclocked memory settings. In one or more implementations, such a notification is displayed after the boot up phase 202 of the system and when the system 100 returns to a working state (e.g., G0/S0 state as specified by ACPI). As discussed above, for instance, the optimization results 128 are provided to an application (e.g., a memory management application) in one or more variations, and information in the optimization results 128 enables the application to display the notification 506 via its user interface 504. It is to be appreciated that the notification 506 is just one example and, in variations, different information is displayable after optimized overclocked memory settings are determined by the system 100 automatically and the system returns from the boot up phase 202 to a working state. Since the optimized overclocked memory settings are determined automatically and without user input to select the values, such a notification is effective to inform a user of the system 100 regarding how the hardware of their system has been adjusted.

Having discussed example systems and user interfaces for automated memory overclocking, consider the following example procedures.

Figure 6:
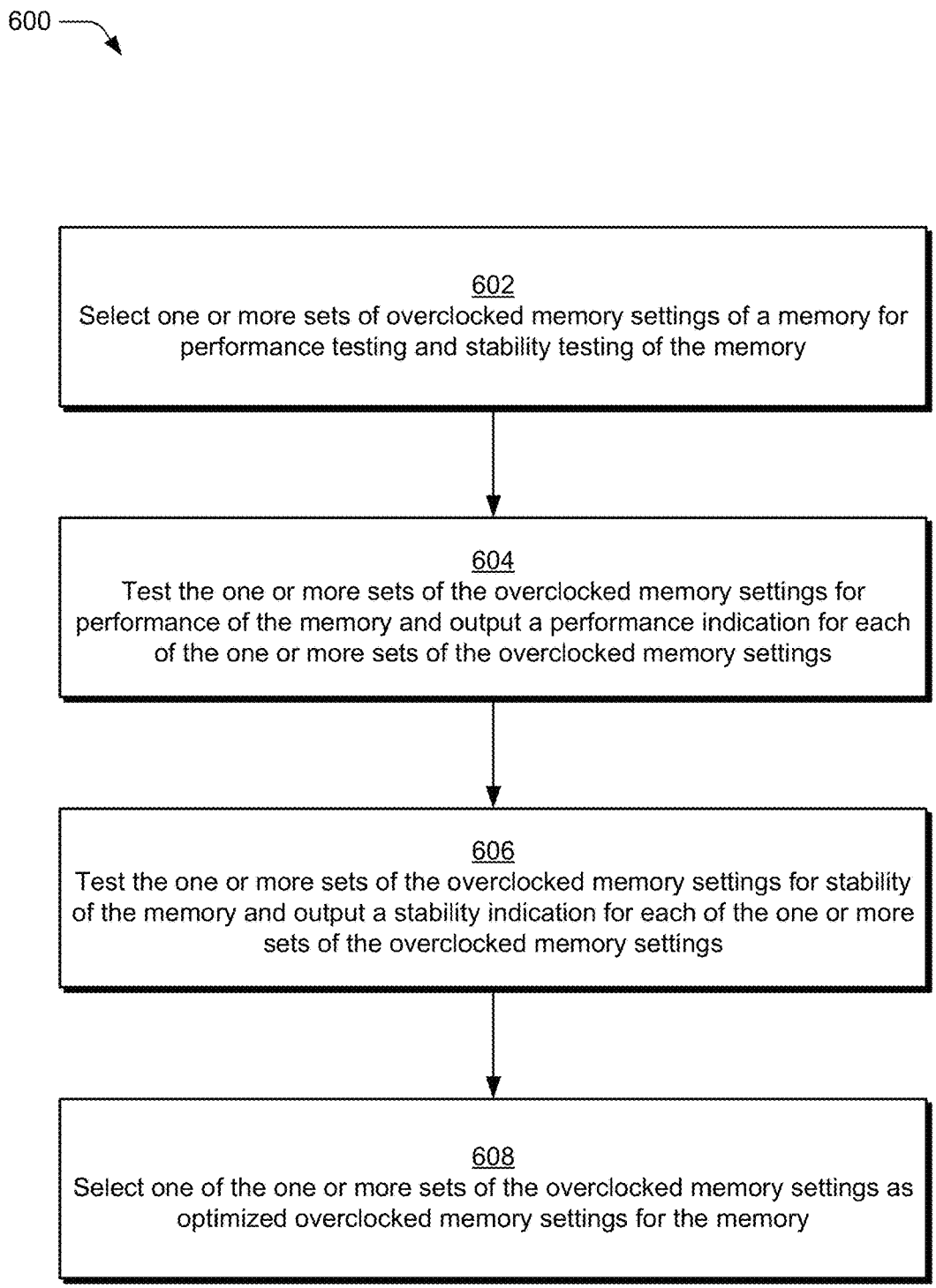
FIG. 6 depicts a procedure in an example implementation of automated memory overclocking.

FIG. 6 depicts a procedure in an example 600 implementation of automated memory overclocking.

One or more sets of overclocked memory settings of a memory are selected for performance testing and stability testing of the memory (block 602). By way of example, the memory controller 104 (e.g., the setting selector component 120) selects first overclocked memory settings 208 and/or second overclocked memory settings 216 for performance testing 204 and stability testing 206. In some cases, this selection is automatic and may occur during a boot up phase 202 of the system 100. In one or more implementations, the system 100 enters the boot up phase 202 based on receipt of the optimization request 126.

The one or more sets of the overclocked memory settings are tested for performance of the memory and a performance indication is output for each of the one or more sets of the overclocked memory settings (block 604). By way of example, the memory controller 104 (e.g., the performance scoring component 122) tests a performance of the first overclocked memory settings 208 and/or the second overclocked memory settings 216 for operating the memory 102. In one or more implementations, the performance scoring component 122 performs the performance testing 204, at least in part, by running one or more workloads with the memory 102 that involve various read and/or write accesses to the memory 102.

As the performance scoring component 122 performs the performance testing 204 on the memory 102, one or more workloads that are run as part of the testing generate performance values 210 and/or the performance values 218, which describe performance of the memory 102 in terms of completing one or more memory-based tasks or operations, when configured according to the first overclocked memory settings 208 and/or the second overclocked memory settings 216, respectively. The performance values 210 and/or the performance values 218 are then used individually or in combination to produce one or more performance indications for the first overclocked memory settings 208 and/or the second overclocked memory settings 216.

The one or more sets of the overclocked memory settings are tested for stability of the memory and a stability indication is output for each of the one or more sets of the overclocked memory settings (block 606). By way of example, the memory controller 104 (e.g., the stability testing component 124) tests a stability of the first overclocked memory settings 208 and/or the second overclocked memory settings 216 for operating the memory 102. As part of the stability testing 206, in one or more implementations, the stability testing component 124 tests a stability of operating the memory 102 with the first overclocked memory settings 208 and/or the second overclocked memory settings 216 by performing reference voltage (Vref) and/or delay-locked loop (DLL) shmoos and/or by generating one or more "eye diagrams" of the memory 102 or portions of the memory 102. Based on the stability testing 206, for instance, the memory controller 104 obtains the margins at which the memory 102 is capable of performing.

As the stability testing component 124 performs the stability testing 206 on the memory 102, the memory controller 104 (e.g., the setting selector component 120 and/or the stability testing component 124) receives stability notifications 212 and/or stability notifications 220, which indicate a response of the memory 102 to the stability tests performed during the boot up phase 202. For instance, as the stability testing component 124 performs reference voltage (Vref) and/or DLL shmoos in the memory 102, the memory controller 104 receives stability notifications 212 and/or stability notifications 220 indicative of operation of the memory 102 and/or margins of its operation, under various combinations of voltage and/or delay levels.

Notably, the setting selector component 120 causes a next set of overclocked memory settings 118 to be tested, e.g., with the performance testing 204 and the stability testing 206. For example, the setting selector component 120 controls testing by the performance scoring component 122 and the stability testing component 124 until optimized overclocked memory settings are determined. By way of example, the setting selector component 120 may first test the first overclocked memory settings 208 and then select an additional set of overclocked memory settings that less aggressively overclock the memory 102 than the first overclocked memory settings 208, such as in a scenario where the stability notifications 212 are processed to generate a prediction that the memory 102 is too unstable if configured to operate with the first overclocked memory settings 208. Alternatively, the setting selector component 120 selects an additional set of overclocked memory settings that more aggressively overclock the memory 102 than the first overclocked memory settings 208, such as in a scenario where the stability notifications 212 are processed to generate a prediction that the memory 102 is stable if configured to operate with the first overclocked memory settings 208 and the predicted stability falls outside of a marginal stability range (i.e., the first overclocked memory settings 208 are "too stable").

One of the one or more sets of the overclocked memory settings are selected as optimized overclocked memory settings for the memory (block 608). By way of example, the setting selector component 120 controls testing by the performance scoring component 122 and the stability testing component 124 until optimized overclocked memory settings are determined. Responsive to determination of optimized overclocked memory settings, the optimization results 128 are output. In one or more implementations, the optimization results 128 include or otherwise indicate the optimized overclocked memory settings. In at least one variation, the memory controller 104 (e.g., the setting selector component 120) outputs the optimization results 128, which causes the memory 102 to operate according to the optimized overclocked memory settings. For example, the memory controller 104 causes the memory 102 to operate according to the optimized overclocked memory settings by sending one or more change signals to a voltage generator (not shown) to adjust a supply voltage (e.g., VDD), such that the clock and power 130 inputs subsequently include a supply voltage as adjusted according to the change signals. Additionally or alternatively, the memory controller 104 sends a change signal to a reference clock generator (not shown) to change a frequency of a clock rate, such that the clock and power 130 inputs subsequently include a reference clock signal as adjusted according to the change signals.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the memory 102, the memory controller 104, the processing unit 106, the setting selector component 120, the performance scoring component 122, and the stability testing component 124) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   a memory; and
   a memory controller to:
      iteratively test performance and stability of overclocked memory settings to determine optimized overclocked memory settings by:
         testing performance of a first set of the overclocked memory settings;
         testing stability of the first set of overclocked memory settings;
         testing performance of at least a second set of the overclocked memory settings; and
         testing stability of the second set of the overclocked memory settings; and
      output the optimized overclocked memory settings.

2. The system of claim 1, wherein the memory controller is further configured to control testing performance and stability until the optimized overclocked memory settings are determined.

3. The system of claim 1, wherein the memory controller is configured to iteratively test at least the first set and second set of the overclocked memory settings during a boot up process of the system.

4. The system of claim 1, wherein the memory controller is further configured to automatically configure the memory to operate with the optimized overclocked memory settings.

5. The system of claim 1, wherein the memory controller is further configured to output the optimized overclocked memory settings in a user interface.

6. The system of claim 1, wherein the second set of overclocked memory settings is selected based on a predicted stability of the first set of overclocked memory settings determined from the testing stability of the first set of overclocked memory settings.

7. The system of claim 6, wherein the second set of overclocked memory settings is selected to more aggressively overclock the memory compared to the first set of overclocked memory settings when the memory is predicted to be stable if configured to operate with the first set of overclocked memory settings.

8. The system of claim 6, wherein the second set of overclocked memory settings is selected to less aggressively overclock the memory compared to the first set of overclocked memory settings when the memory is predicted to be unstable if configured to operate with the first set of overclocked memory settings.

9. The system of claim 6, wherein the memory controller is further configured to determine whether to conduct a subsequent iteration of testing performance and stability for at least a third set of overclocked memory settings based on a predicted stability of the second set of overclocked memory settings determined from the testing stability of the second set of overclocked memory settings.

10. The system of claim 1, wherein the memory controller is further configured to select the first set or the second set of the overclocked memory settings as the optimized overclocked memory settings.

11. The system of claim 1, wherein the first set of the overclocked memory settings are different than the second set of overclocked memory settings.

12. A method comprising:
selecting a first set of overclocked memory settings of a memory for performance testing and stability testing of the memory;
testing the first set of overclocked memory settings for performance of the memory and outputting a performance indication;
testing the first set of overclocked memory settings for stability of the memory and outputting a stability indication for the first set of overclocked memory settings;
selecting at least a second set of overclocked memory settings for performance testing and stability testing of the memory, the second set of overclocked memory settings selected based on the stability indication; and
selecting one of the first set or the second set of the overclocked memory settings as optimized overclocked memory settings for the memory.

13. The method of claim 12, further comprising automatically configuring memory to operate with the optimized overclocked memory settings.

14. The method of claim 12, further comprising outputting the optimized overclocked memory settings in a user interface.

15. The method of claim 14, wherein the user interface includes one or more controls to enable adjustment of the optimized overclocked memory settings.

16. A computing device comprising:
a memory controller to:
initiate a boot up process of the computing device to automatically select optimized overclocked memory settings for a memory; and
during the boot up process of the computing device:
test performance of a first set of overclocked memory settings;
test stability of the first set of overclocked memory settings;
test performance of at least a second set of overclocked memory settings;
test stability of the second set of overclocked memory settings; and
select one of the first set or the second set of overclocked memory settings as the optimized overclocked memory settings.

17. The computing device of claim 16, wherein the memory controller is further configured to automatically configure the memory to operate with the optimized overclocked memory settings.

18. The computing device of claim 16, wherein the memory controller is further configured to output the optimized overclocked memory settings in a user interface.

19. The computing device of claim 18, wherein the user interface enables adjustment of the optimized overclocked memory settings.

20. The computing device of claim 16, wherein the memory controller initiates the boot up process responsive to user input to a user interface to select optimized overclocked memory settings.

* * * * *